(12) United States Patent
Shin et al.

(10) Patent No.: US 8,964,247 B2
(45) Date of Patent: Feb. 24, 2015

(54) METHOD AND SYSTEMS FOR CREATING A PRINTER MODEL BASED ON PRINT COLUMNS

(75) Inventors: Helen Haekyung Shin, Fairport, NY (US); Thomas F. Wade, Rochester, NY (US); Lisa Michelle Bozek, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 573 days.

(21) Appl. No.: 13/283,901

(22) Filed: Oct. 28, 2011

(65) Prior Publication Data

US 2013/0106936 A1     May 2, 2013

(51) Int. Cl.
*H04N 1/46*     (2006.01)
*H04N 1/60*     (2006.01)

(52) U.S. Cl.
CPC .................................. *H04N 1/603* (2013.01)
USPC .............................. 358/1.9; 358/1.8; 358/504

(58) Field of Classification Search
USPC ............ 358/1.8, 1.9, 2.1, 504, 518, 519, 530; 347/20
See application file for complete search history.

(56) References Cited

U.S. PATENT DOCUMENTS

| | | | |
|---|---|---|---|
| 5,923,347 A | 7/1999 | Wade | |
| 5,956,015 A * | 9/1999 | Hino | 345/600 |
| 6,076,915 A * | 6/2000 | Gast et al. | 347/19 |
| 6,300,968 B1 | 10/2001 | Kerxhalli et al. | |
| 6,435,654 B1 | 8/2002 | Wang et al. | |
| 6,757,629 B2 * | 6/2004 | Takizawa et al. | 702/85 |
| 6,779,861 B2 | 8/2004 | Mori | |
| 7,543,911 B2 | 6/2009 | Mizes et al. | |
| 7,880,930 B2 | 2/2011 | Zhang et al. | |
| 7,961,351 B2 | 6/2011 | Wang et al. | |
| 2002/0082789 A1 * | 6/2002 | Takizawa et al. | 702/85 |
| 2005/0185009 A1 * | 8/2005 | Claramunt et al. | 347/16 |
| 2005/0190216 A1 * | 9/2005 | Yamazaki et al. | 347/6 |
| 2005/0270599 A1 * | 12/2005 | Kitazawa | 358/518 |
| 2007/0081172 A1 | 4/2007 | Mantell | |
| 2007/0211275 A1 * | 9/2007 | Cumming | 358/1.9 |
| 2008/0211844 A1 * | 9/2008 | Yamazaki et al. | 347/9 |
| 2008/0252931 A1 | 10/2008 | Mestha et al. | |
| 2009/0033954 A1 * | 2/2009 | Bray | 358/1.9 |
| 2009/0162110 A1 * | 6/2009 | Murayama | 399/301 |
| 2009/0290180 A1 * | 11/2009 | Onoda | 358/1.9 |
| 2009/0296108 A1 | 12/2009 | Gil et al. | |
| 2010/0039657 A1 | 2/2010 | Wang et al. | |
| 2010/0315461 A1 | 12/2010 | Mongeon et al. | |
| 2010/0315677 A1 * | 12/2010 | Yamamoto | 358/1.15 |
| 2011/0286014 A1 * | 11/2011 | Wu et al. | 358/1.9 |
| 2012/0242910 A1 * | 9/2012 | Ivashin | 348/745 |

* cited by examiner

*Primary Examiner* — Jerome Grant, II
(74) *Attorney, Agent, or Firm* — Fay Sharpe LLP

(57) ABSTRACT

Disclosed are methods and systems for creating a printer model which maps device dependent color space representations of reference colors to device independent color space representations of the reference colors for a direct marking color printer. According to an exemplary method, a plurality of printer models are initially generated, each printer model corresponding to a predetermined width associated with the cross-process direction of an image receiving surface.

21 Claims, 11 Drawing Sheets

METHOD AND SYSTEMS FOR CREATING A PRINTER MODEL BASED ON PRINT COLUMNS

BACKGROUND

This disclosure relates to color image output systems. Specifically, this disclosure relates to a system and method of controlling an image output device to produce a consistent spectrum of colors and color separations.

To meet customer demands, image output devices such as a printer or display need to produce a consistent spectrum of colors over time. For example, customers want a printing system to produce a particular colored document consistently from day to day, or print job to print job.

To control the color rendering consistency of a printing device, the printing device is typically characterized and calibrated prior to being shipped to a customer. The characterization and calibration process produces a set of LUTs (look-up tables) which correlate a standardized set of target colors with the appropriate device dependent color space values necessary to produce the target colors with the printing device. For example, a Pantone® color spectrum may be utilized as a color target reference and the LUTs produced by the characterization and calibration process are device dependent CMYK color space representations of the Pantone® target colors. This characterization and calibration process is generally referred to as profiling a device or printer.

To accomplish the profiling of a printing device, a spectrophotometer or other image sensing device is used to measure the colorimetric properties of the produced images. These measured colorimetric properties provide an objective basis of comparison to the reference target color set and provide the necessary feedback to iteratively generate accurate device dependent LUTs. Stated another way, device independent CMYK values are correlated to the reference target color set, and the LUT correlates the reference target color set device independent CMYK values to the device dependent CMYK values.

Notably, the profiling methods discussed above can be applied to xerographic and direct marking color printing system, such as an ink jet printer.

To properly profile or calibrate a color printer, a printer model is first generated which maps a plurality of colorant combinations to a device independent color space, such as LAB, etc. To create an ICC profile, the inverse of the printer model can be used to map from a device independent color space to device dependent color space, for example, CMYK.

To create device independent color space representations of printed colors, patterns or series of patches are printed and, subsequently, a spectraphotometer measures the spectral properties of the printed patterns. The spectral properties associated with the printed patterns are used to generate a model for the printer.

INCORPORATION BY REFERENCE

U.S. Pat. No. 6,300,968 by Kerxhalli et al., issued Oct. 9, 2001 and entitled "COLOR PRINTING PROCESS DIRECTION COLOR REGISTRATION SYSTEM WITH EXPENDED CHEVRONS" is incorporated herein by reference in its entirety.

BRIEF DESCRIPTION

In one embodiment of this disclosure, described is a method for creating a printer model which maps device dependent color space representations of reference colors to device independent color space representations of the reference colors for a direct marking color printer including a plurality of colorants, the direct marking color printer including an image receiving surface configured to move in a process direction associated with the direct marking color printer, and the direct marking color printer including a first colorant array of printheads arranged in a cross-process direction to deposit a first colorant marking material onto the image receiving surface and a second colorant array of printheads arranged in a cross-process direction to deposit a second colorant marking material onto the image receiving surface, the first colorant array of printheads and the second colorant array of printheads offset in the process direction, and each printhead including a plurality of ink jets, the method comprising a) generating a color calibration pattern including a plurality of device dependent color space representations of reference colors, the color calibration pattern including a predetermined width associated with the cross-process direction and a predetermined length associated with the process direction, the predetermined width less than or equal to a cross-process width associated with each printhead; b) printing the color calibration pattern using a first printhead associated with the first colorant array and a first printhead associated with the second colorant array, the first printheads substantially aligned along a process direction axis and offset from each other; c) printing the color calibration pattern using a second printhead associated with the first colorant array and a second printhead associated with the second colorant array, the second printheads substantially aligned along a process direction axis and offset from each other; d) generating device independent color space representations of the color calibration pattern for the first printhead and the second printhead; and e) generating a printer model for the direct marking color printer which maps the plurality of device dependent color space representations of the color calibration pattern to device independent color space representations of the color calibration pattern reference colors.

In another embodiment of this disclosure, described is a system for creating a printer model which maps device dependent color space representations of reference colors to device independent color space representations of the reference colors for a direct marking color printer including a plurality of colorants, the system comprising a direct marking color printer including an image receiving surface configured to move in a process direction associated with the direct marking color printer, and the direct marking color printer including a first colorant array of printheads arranged in a cross-process direction to deposit a first colorant marking material onto the image receiving surface and a second colorant array of printheads arranged in a cross-process direction to deposit a second colorant marking material onto the image receiving surface, the first colorant array of printheads and the second colorant array of printheads offset in the process direction, and each printhead including a plurality of ink jets; and a controller operatively connected to the direct marking color printer, the controller configured to perform a method comprising a) generating a color calibration pattern including a plurality of device dependent color space representations of reference colors, the color calibration pattern including a predetermined width associated with the cross-process direction and a predetermined length associated with the process direction, the predetermined width less than or equal to a cross-process width associated with each printhead; b) printing the color calibration pattern using a first printhead associated with the first colorant array and a first printhead associated with the second colorant array, the first printheads substantially aligned along a process direction axis and offset from each other; c) printing the color calibration pattern using a second printhead associated with the first colorant array and a second printhead associated with the second colorant array, the second printheads substantially aligned along a process direction axis and offset from each other; d) generating device independent color space representations of the color calibration pattern for the first printhead and the second printhead; and e) generating a printer model for the direct marking color printer which maps the plurality of device dependent color space representations of the color calibration pattern to device independent color space representations of the color calibration pattern reference colors.

In still another embodiment of this disclosure, described is a color printing system comprising a direct marking color printer including an image receiving surface configured to move in a process direction associated with the direct marking color printer, and the direct marking color printer including a first colorant array of printheads arranged in a cross-process direction to deposit a first colorant marking material onto the image receiving surface and a second colorant array of printheads arranged in a cross-process direction to deposit a second colorant marking material onto the image receiving surface, the first colorant array of printheads and the second colorant array of printheads offset in the process direction, and each printhead including a plurality of ink jets; and a controller operatively connected to the direct marking color printer, the controller configured to access a printer profile look-up table to print an image using the direct marking color printer, the printer profile look-up table generated based on a printer model created by a method comprising a) generating a color calibration pattern including a plurality of device dependent color space representations of reference colors, the color calibration pattern including a predetermined width associated with the cross-process direction and a predetermined length associated with the process direction, the predetermined width less than or equal to a cross-process width associated with each printhead; b) printing the color calibration pattern using a first printhead associated with the first colorant array and a first printhead associated with the second colorant array, the first printheads substantially aligned along a process direction axis and offset from each other; c) printing the color calibration pattern using a second printhead associated with the first colorant array and a second printhead associated with the second colorant array, the second printheads substantially aligned along a process direction axis and offset in the process direction; d) generating device independent color space representations of the color calibration pattern for the first printheads and the second printheads; and e) generating a printer model for the direct marking color printer which maps the plurality of device dependent color space representations of the color calibration pattern to device independent color space representations of the color calibration pattern reference colors.

DETAILED DESCRIPTION

This disclosure provides a color calibration pattern that is designed for direct marking color printer architecture. In addition, an averaging technique that improves the accuracy of the color printer model is provided that maps input CMYK to LAB in a printer profile. The test pattern layout by columns can also be applied to improve different IQ attributes such as line quality, graininess and uniformity for the direct marking color printer and is an effective way of assessing the image quality of different printheads in the direct marking color printer. The pattern can also be used for diagnosing the variability of the printheads by columns.

Direct marking printheads (PHs) in direct marking printing systems include a number of unique characteristics that make standard patterns used for printer model generation non optimal. For example, assume a printer consists of 56 PHs (printheads) housed in 16 print box units (PBU) in the print zone. 7 PHs from 2 PBUs are stitched together to achieve full width printing of 300 dpi. The 7 PHs units are interlaced with the other set of 7 PHs to achieve 600 dpi 20" full width printing. Two interlaced PHs in the same print column often shows the range of variability in color output compared to those from other print columns due to the misalignment of PHs, missing jets in the PHs and so on. To characterize the color of the printer accurately, the test pattern has to be designed to include this variability of the color in the printer. The full page color characterization target with random distribution of color patches may not provide a sufficient sampling of colors for the accurate printer model for a direct marking printer as described.

Disclosed here is a color calibration pattern that is designed for a direct marking printer architecture. In addition, an averaging technique is provided that improves the accuracy of the color printer model that maps input CMYK to LAB in the printer ICC profile. The test pattern within the PH column can be treated as one printer. For example, a test pattern can contain 7 PH columns and thus 7 color measurements from 7 different "printers." The pattern is also very useful for diagnosing the variability of the PHs by columns. For example, the registration errors caused by a particular PH of a row can be eliminated. Other applications of a test pattern layout can be used to evaluate different IQ attributes such as line quality, graininess and uniformity for a direct marking printer.

Figure 1:
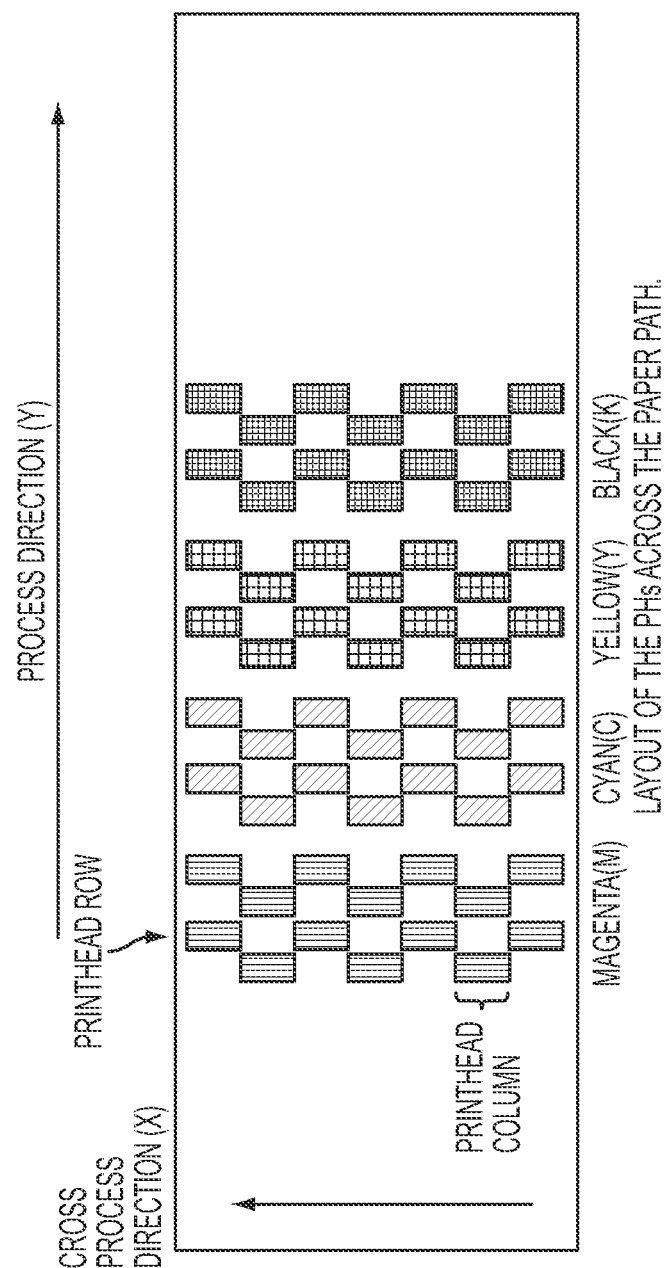
FIG. 1 illustrates an exemplary layout of printheads (PHs) across a continuous paper path according to an exemplary embodiment of this disclosure.

The print zone of a continuous feed direct marking printer consists of an array of PHs arranged in a grid along the paper path. FIG. 1 shows one possible arrangement of the PHs.

The PHs in the same row are stitched together to achieve 20" full width printing and the PHs of the same colors in the same column are interlaced together to achieve 600 dpi printing in x direction, where each individual PH prints at 300 dpi in x.

Figure 2:
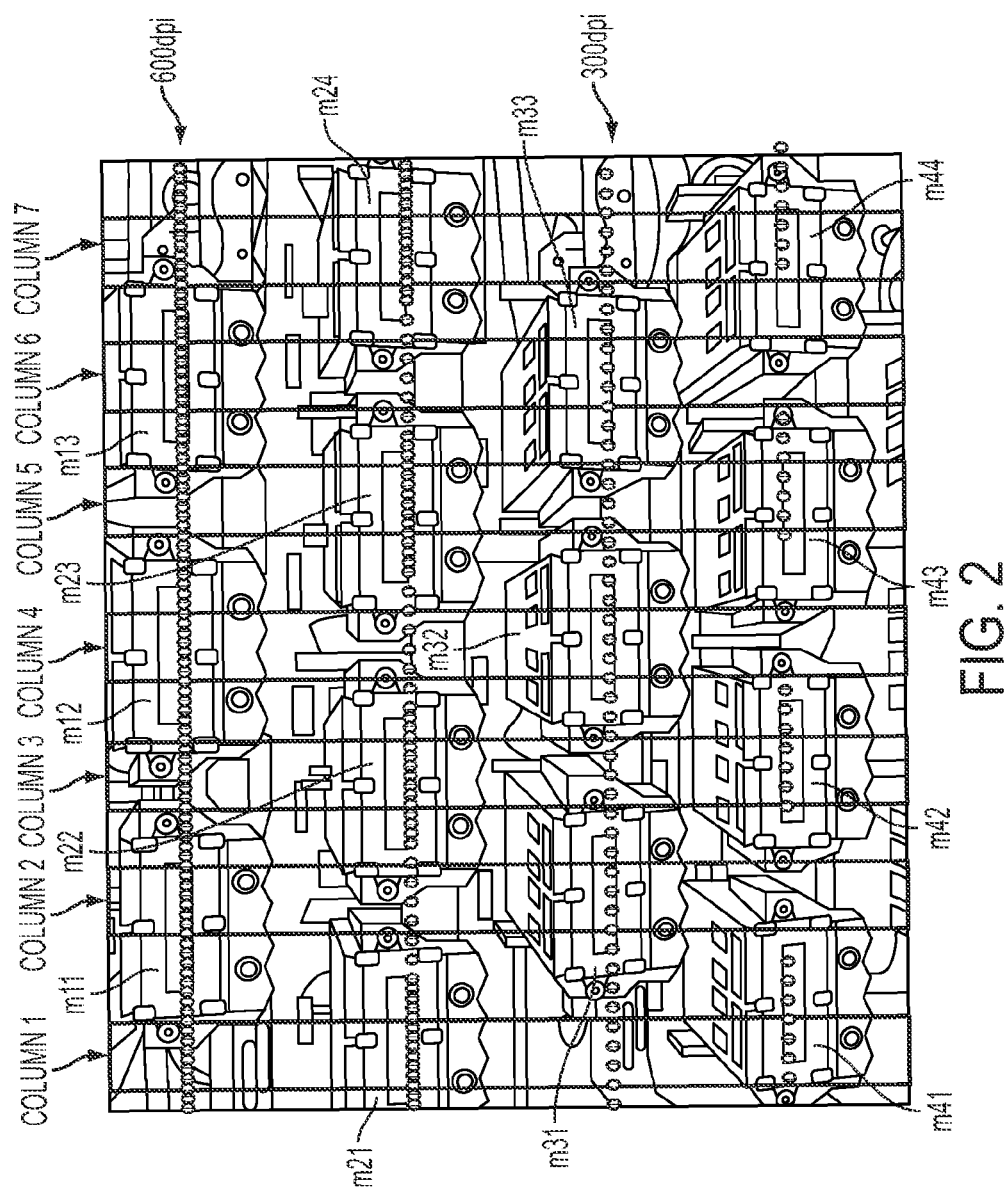
FIG. 2 is a photograph of a magenta print unit including 14 PHs and 4 PBUs (print bar units) and a schematic view of achieving 600 dpi lines through each PBU.

The image quality is very sensitive to the alignment of the PHs. FIG. 2 shows a photograph of magenta head units. The head units include PH M11 (Row 1, Column 1), M12 (Row 1, Column 2), M13 (Row 1, Column 3), M21 (Row 2, Column 1), etc. If two adjacent PHs are not correctly aligned, there may be a gap or overlap at the transition between the heads. If two PHs in the same column and same color along the process direction are not correctly spaced in the x direction, jets may pair up resulting in high frequency streaks. If two PHs in the same column and a different color along the process direction are not correctly spaced in the x direction, color shifts may result as the imaging changes from drop next to drop to drop on drop.

Figure 3:
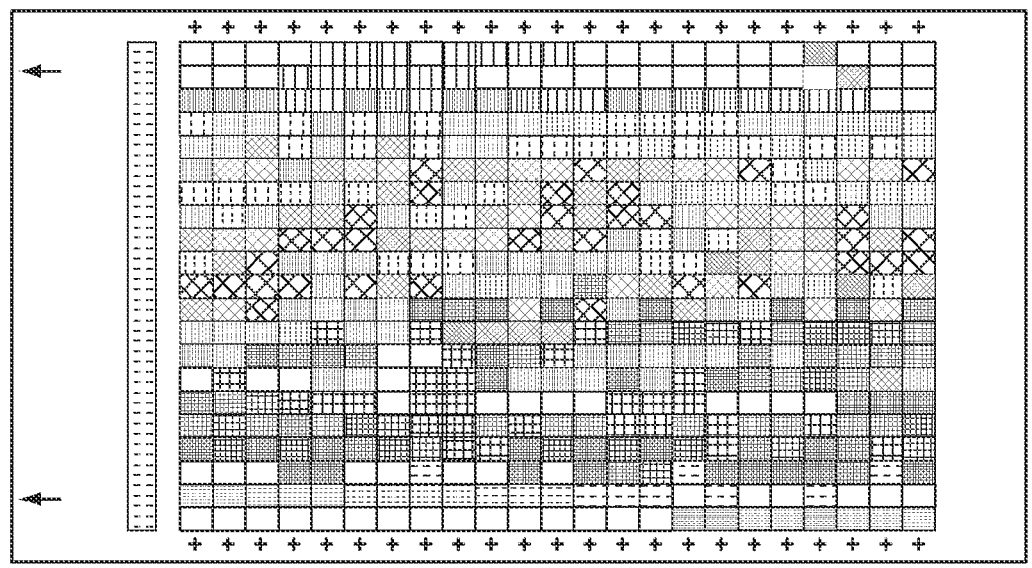
FIG. 3 is an exemplary embodiment of a 17×11 color calibrating target set.

FIG. 3 shows an example of a layout of full page color calibration targets commonly used in a printer that use the full width head or xerographic engine. As shown in FIG. 3, color patches are distributed in a random manner within the page to achieve averaging of colors in the printer. However, since the colors in this page will be printed from several different PHs in a direct marking printer, the color variability of different PHs will be compounded in the measurement. In other words, it will be hard to diagnose the variability of colors from the measurement collected from the test pattern shown in FIG. 3.

Therefore, this disclosure provides a different layout of a test pattern that contains a set of color patches with a controlled measurement of color variation. First, the test pattern is designed so that the colors can be sampled to separate out the PH non-uniformity caused by the stitch errors of the PHs in the cross process direction(x). Second, each PH may contain one or more jets that fail to print, therefore, the test pattern needs to diagnose those failing jets easily.

Figure 4:
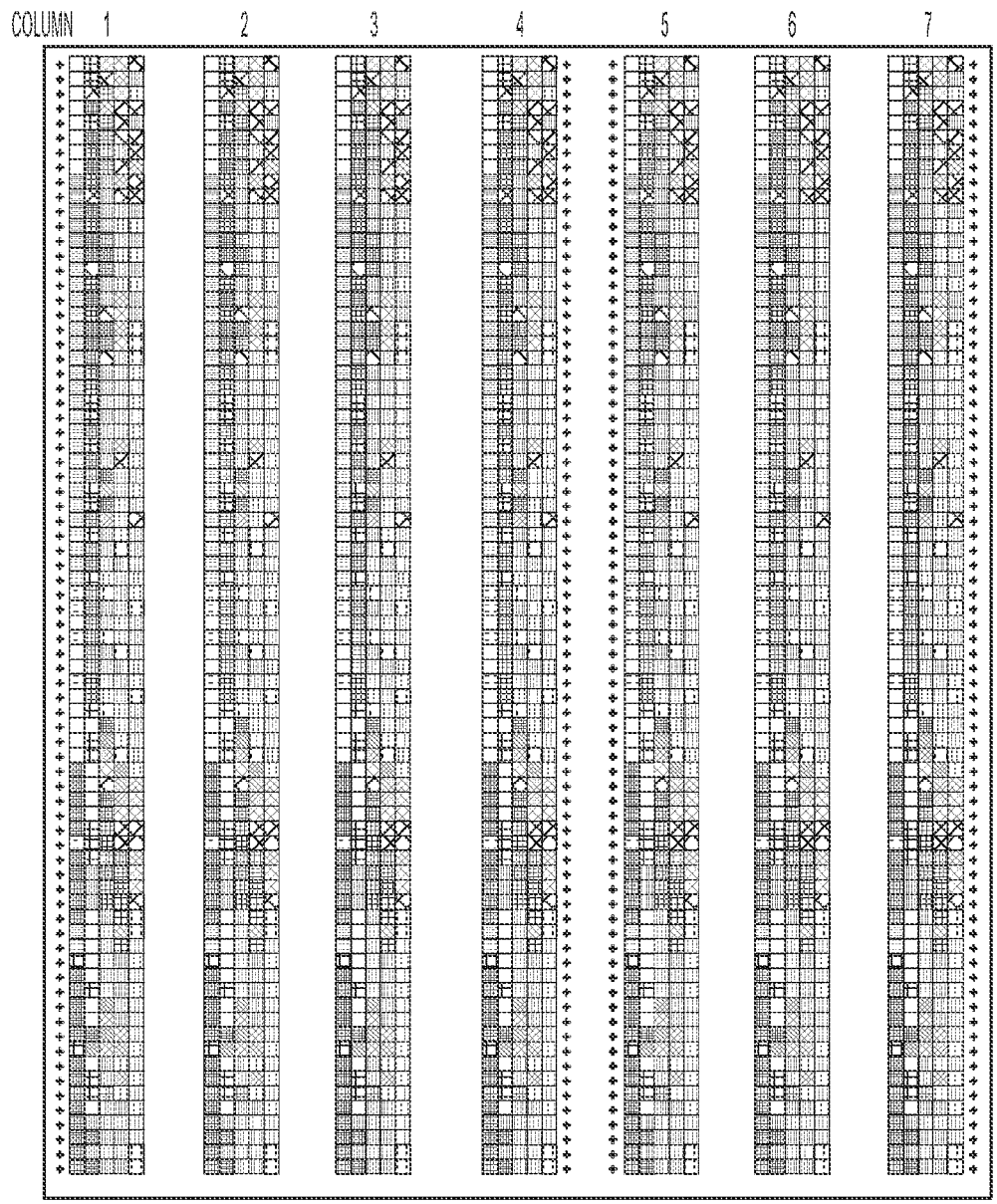
FIG. 4 is an exemplary embodiment of a column-wise color test pattern (20" width×26" height)

Providing a column-wise test pattern detects color variation caused by one or more missing jets in a particular PH better than a test pattern as shown in FIG. 3. FIG. 4 shows one example of two combined test targets designed for a direct marking printer color calibration according to this disclosure which can be measured using a spectrophotometer, such as an i1SisXL spectrophotometer. Notably, the 20" target is cut in half lengthwise because it is too wide for the spectrophotometer, i.e., 4 printhead columns on one side and 3 printhead columns on the other side. In order to achieve 600 dpi printing, the patches in the test pattern are printed from the PHs of the upper PBU and the lower PBU of the same color unit in the same column (see FIGS. 1 and 2). In addition, the width of the allowable printable area with 4 color PHs that excludes the area from the other print columns should be about 2 inches according to the exemplary embodiment disclosed herein. (See FIG. 2.)

Other possible layouts can include the same basic concept with horizontal bands of every color across the 20" width, the bands changing color every 6 mm down the page. Notably, it would take more pages to do all colors. Depending on the variation of the PH the data from a certain column can be excluded from the average measurement to improve the accuracy of the color printer model used for the printer ICC profiles.

The color stability of some solid ink jet printers is known to be very good compared to other xerographic printers. This enables a fleet printer model and printer ICC profile for a stable solid ink jet printer. The adjustment routines for the color non-uniformity in the print engine can be done regularly. The printer model and ICC profile can be generated offline and put in the digital front end (DFE) of the printer. The accuracy of the printer model will be keyed to the success of the color correction in the printer. To improve the accuracy of the printer several repeats of patches can be included and averaged together in the target in the same column. For example, about 5000 patches can be measured from each column and 2000 patches among them are the repeats of patches. For the final printer model, an average of 7 columns measurement can be used.

As shown in table 1 the accuracy of a printer model using a particular training set can be improved using the average measurement from the column-wise pattern.

TABLE 1

ΔE Comparison of the printer model between one page target and column-wise target.

| | Max ΔE | Average ΔE |
|---|---|---|
| One page target | 2.43 | 0.5 |
| Column-wise target | 1.05 | 0.18 |

Figure 5:
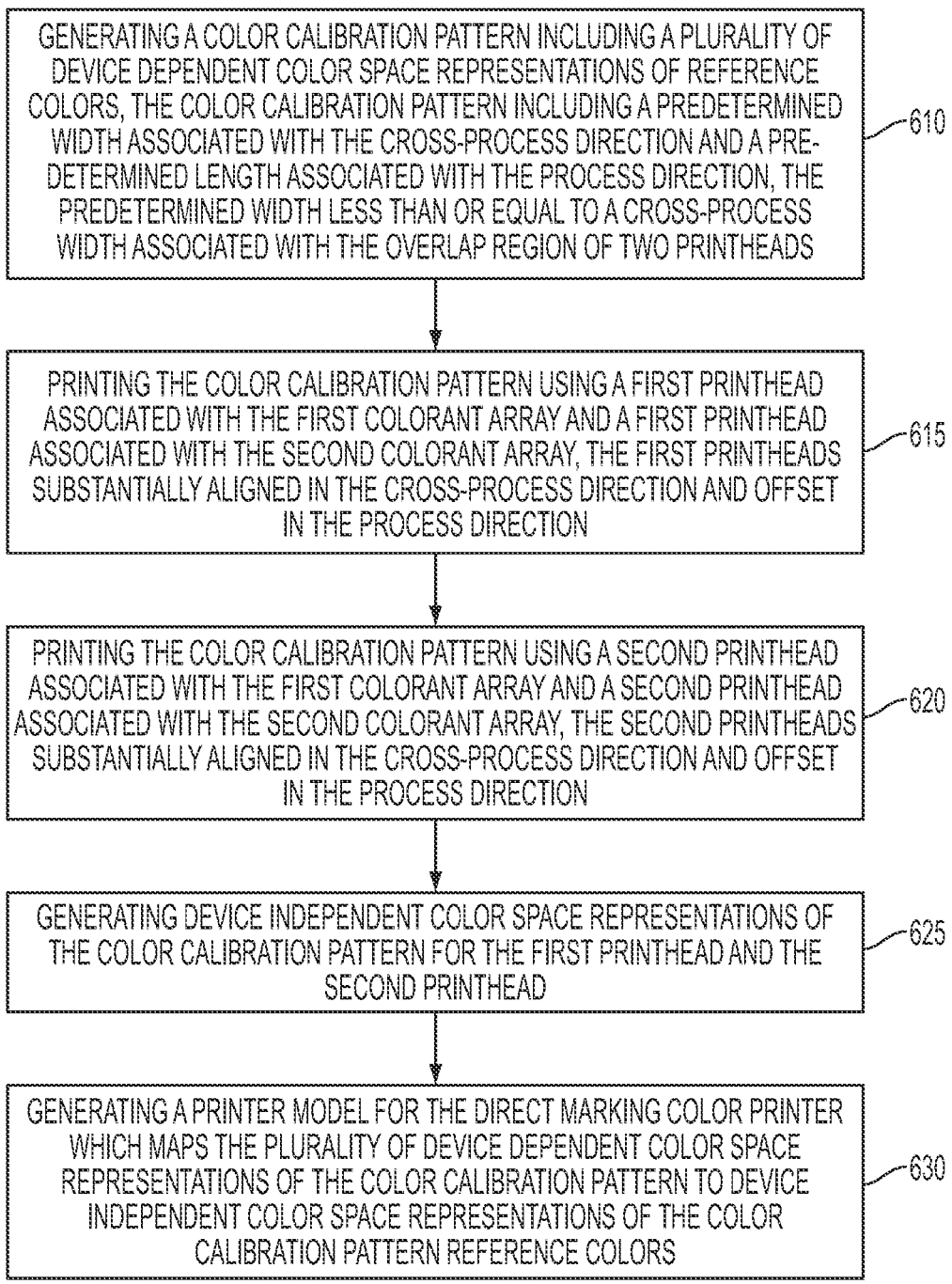
FIG. 5 is a flow chart of an exemplary method for creating a printer model according to this disclosure.

With reference to FIG. 5, described now is an exemplary method for creating a printer model which maps device dependent color space representations of reference colors to device independent color space representations of the reference colors for a direct marking color printer according to this disclosure. The direct marking printer includes a plurality of colorants, an image receiving surface configured to move in a process direction associated with the direct marking color printer, and a first colorant array of printheads arranged in a cross-process direction to deposit a first colorant marking material onto the image receiving surface and a second colorant array of printheads arranged in a cross-process direction to deposit a second colorant marking material onto the image receiving surface. The first colorant array of printheads and the second colorant array of printheads are offset in the process direction, and each printhead includes a plurality of ink jets.

The method includes:

a) generating 610 a color calibration pattern including a plurality of device dependent color space representations of reference colors, the color calibration pattern including a predetermined width associated with the cross-process direction and a predetermined length associated with the process direction, the predetermined width less than or equal to a cross-process width associated with each printhead;

b) printing 615 the color calibration pattern using a first printhead associated with the first colorant array and a first printhead associated with the second colorant array, the first printheads substantially aligned in the cross-process direction and offset in the process direction;

c) printing 620 the color calibration pattern using a second printhead associated with the first colorant array and a second printhead associated with the second colorant array, the second printheads substantially aligned in the cross-process direction and offset in the process direction;

d) generating 625 device independent color space representations of the color calibration pattern for the first printhead and the second printhead; and e) generating 630 a printer model for the direct marking color printer which maps the plurality of device dependent color space representations of the color calibration pattern to device independent color space representations of the color calibration pattern reference colors.

To generate a final printer model, printer models for each column of the color calibration target are generated independently and averaged, according to one exemplary method. Notably, the seven column calibration pattern illustrated in FIG. 4 is used to produce seven printer models which can then be averaged to produce a final printer model.

Figure 8:
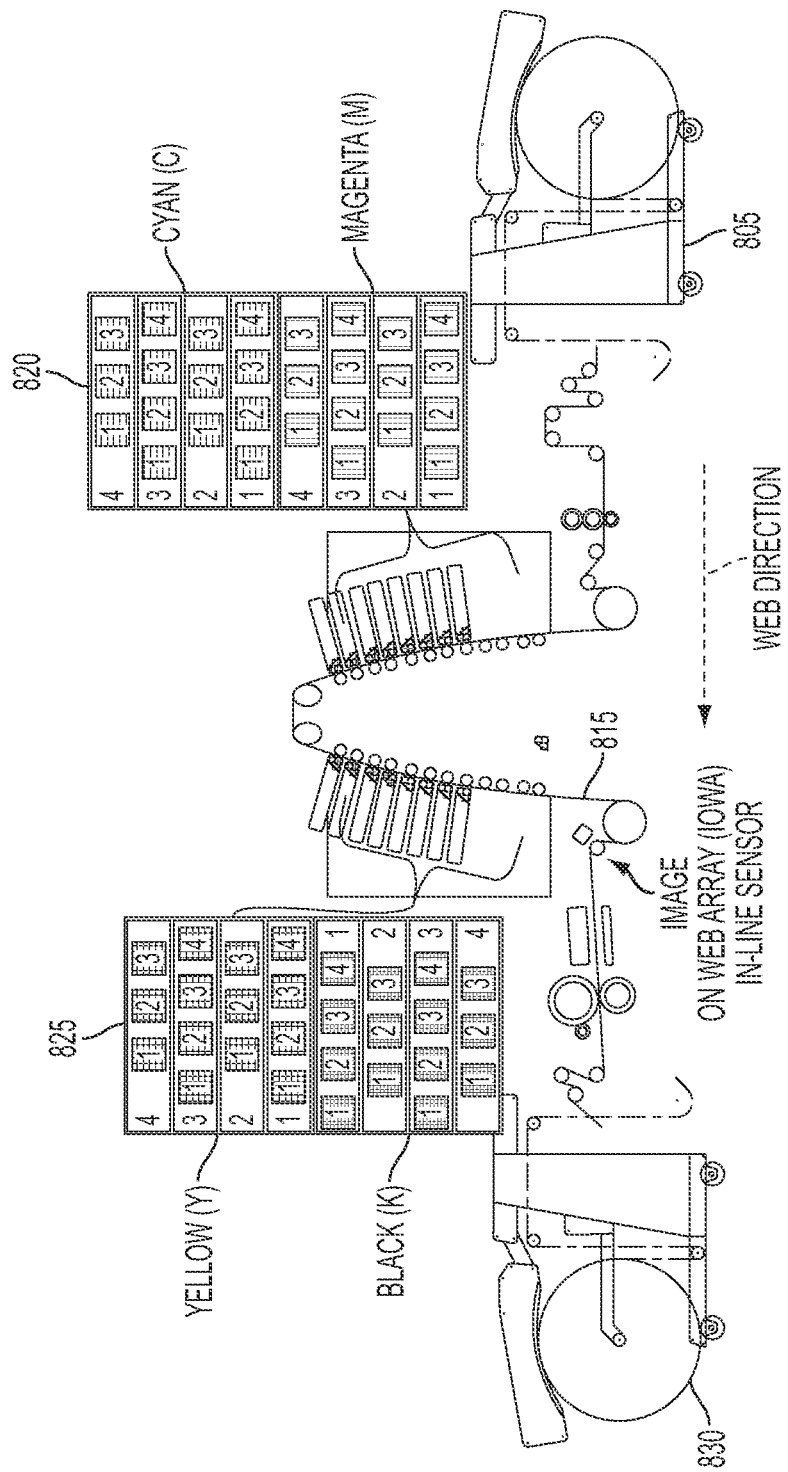
FIG. 8 is a simplified elevational view of a direct-to-sheet continuous-web color marking device according to an exemplary embodiment of this disclosure.

With reference to FIG. 8, illustrated is a simplified elevational view of an exemplary direct-to-sheet continuous web direct marking printing system according to this disclosure. The printing system includes a spool 805 which is unwound, as needed, to provide a substantially continuous web of substrate 815 for direct-marking by the magenta (M) print unit 820, the cyan (C) print unit 820, the yellow (Y) print unit 825 and the black (K) print unit 825. As previously described, each print unit includes multiple printheads arranged as illustrated in FIG. 8. The printheads include ink jets which directly mark the media substrate 815 with ink to form a full color image. The marked media substrate is subsequently wound on another spool 830.

To produce the column-wise test pattern shown in FIG. 4, the following print units/printheads are utilized for each column.

Column 1: C14, C34, M14, M34, Y11, Y31, K11, and K31.
Column 2: C43, C23, M43, M23, Y21, Y41, K21, and K41.
Column 3: C13, C33, M13, M33, Y12, Y32, K12, and K32.
Column 4: C22, C42, M22, M42, Y22, Y42, K22, and K42.
Column 5: C12, C32, M12, M32, Y13, Y33, K13, and K33.
Column 6: C23, C43, M23, M43, Y23, Y43, K23, and K43.
Column 7: C11, C31, M11, M31, Y14, Y34, K14, and K34.

Figure 6:
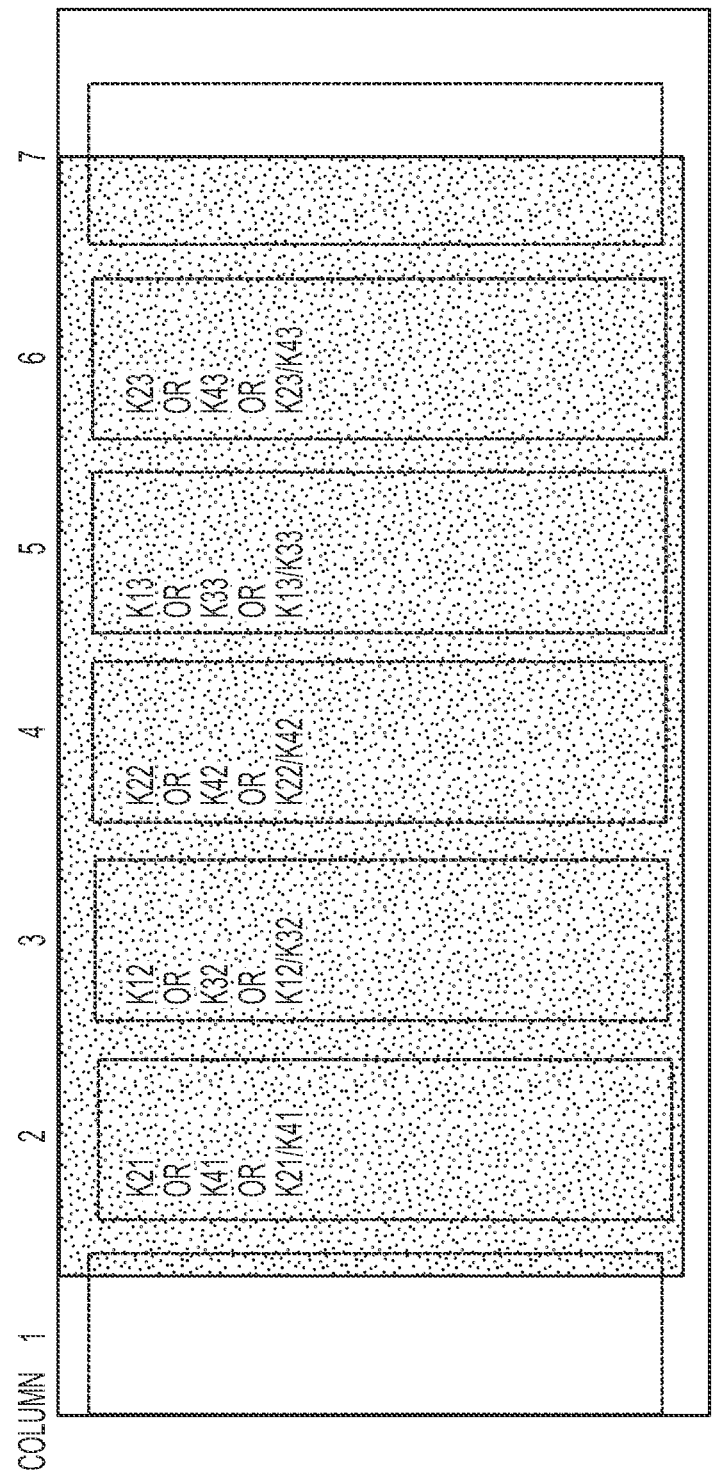
FIG. 6 is an exemplary embodiment of an image quality test pattern to perform a column-wise measurement and analysis of full page HT targets (11"×17")
Figure 7:
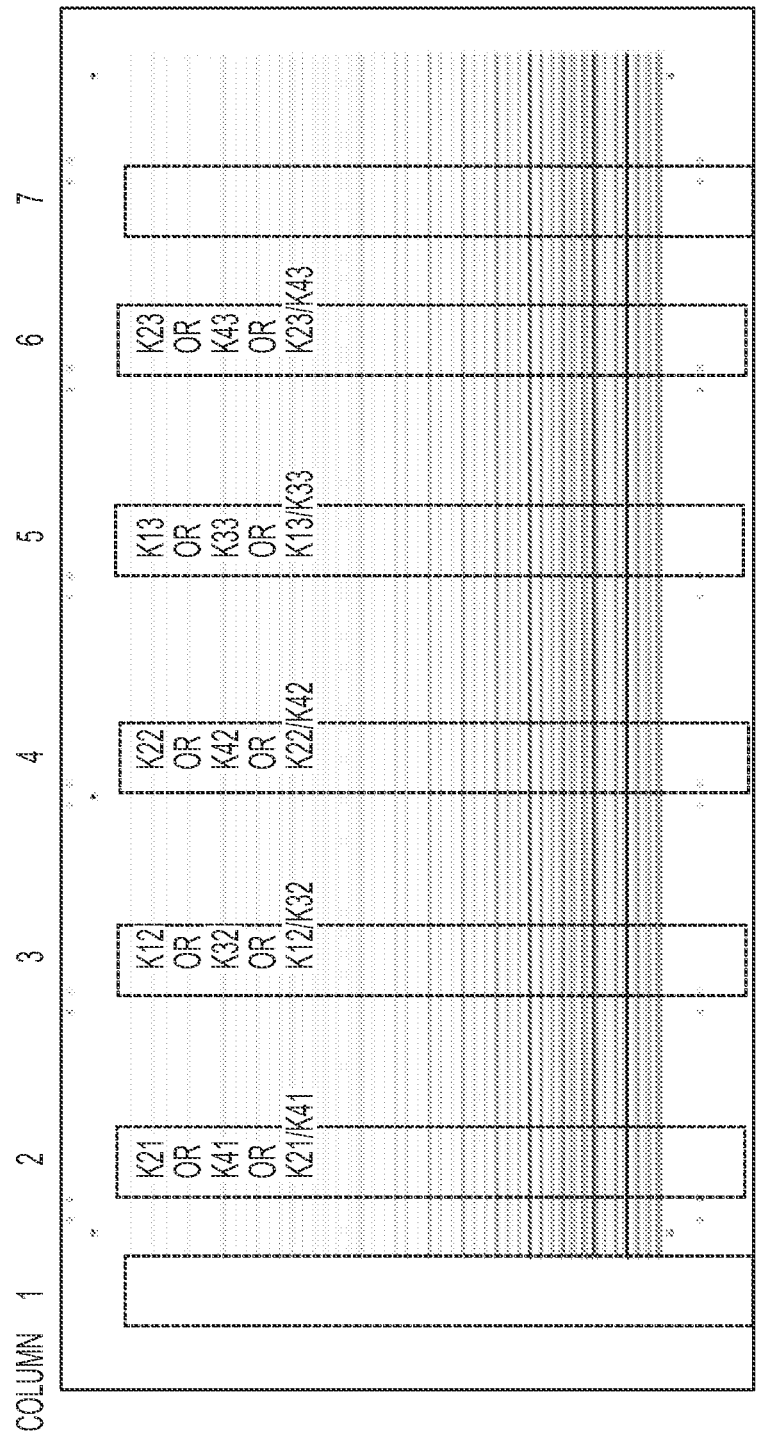
FIG. 7 is an exemplary embodiment of horizontal line targets: 300 dpi and 600 dpi 100K % 1, 2, 3, 4, 5, 10 and 15 pixel lines.

FIGS. 6 and 7 show examples of column-wise analysis of image quality test patterns for Macro-uniformity target and line quality target. The analysis of these targets can be used to track down the uniformity and the line quality of PHs in each column. Notably, K21 corresponds to K (Black) printhead in row 2, column 1; K41 corresponds to K printhead in row 4, column 1; etc.

Figure 9:
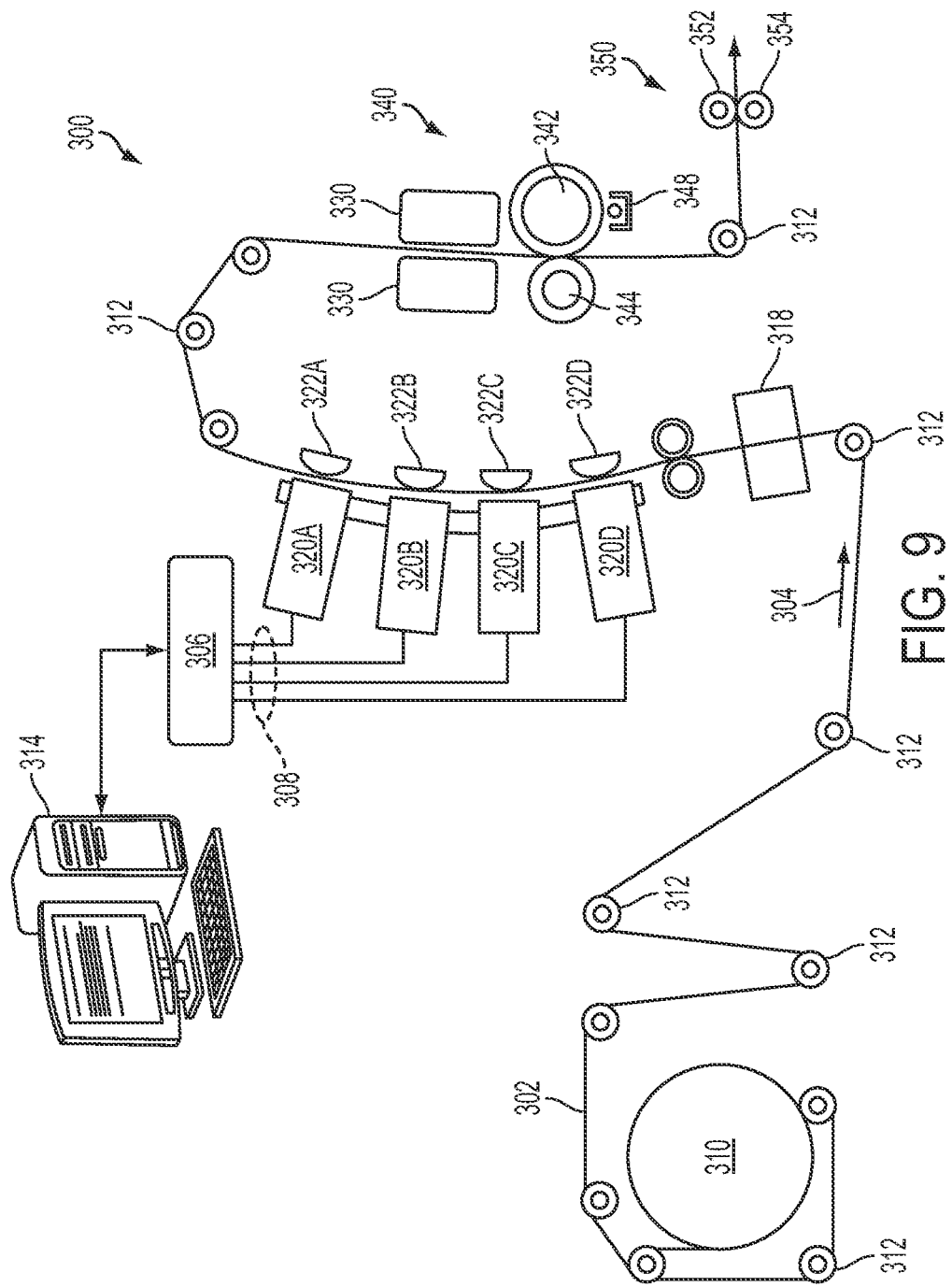
FIG. 9 is a simplified elevational view of another direct-to-sheet continuous-web color marking device according to an exemplary embodiment of this disclosure.

With reference to FIG. 9, illustrated is a simplified elevational view of another exemplary direct-to-sheet continuous web direct marking printing system according to this disclosure.

In the embodiment shown, a substantially continuous web of substrate 302, such as, for example, paper, plastic, or other print material, supplied on a spool 310 is unwound as needed, propelled by a variety of motors not shown. A set of rolls, each at 312, controls the tension of the unwinding web 302 as the substrate moves along a path in the process direction 304. Along the path, there is provided a preheater 318, which brings the web to an initial predetermined temperature. The preheater can rely on contact, radiant, conductive, or convective heat to bring the web W to a target preheat temperature, in one practical embodiment, of about 30° C. to about 70° C.

The web 302 moves through a printing station which, in the embodiment shown, includes printheads 320A, 320B, 320C, and 320D. Each printhead extends across the width of the web and is capable of placing ink of a primary color onto the moving substrate to form a full-color image. The placement of the individual colors from the printheads is based on the image data sent to each printhead from a control unit 306 through the image path, shown collectively at 308. On other embodiments, multiple printheads are provided for each primary color and can each be arranged in a linear array. The function of each color printhead, in the embodiment of multiple printheads provided for each color, can be divided among multiple distinct printheads located at different locations along the process direction or the printheads or portions thereof can be mounted movably in a direction transverse to the process direction 304, such as for spot-color applications.

In one embodiment, the control unit 306 incorporates various aspects of the present method for creating a printer model based on print columns as discussed herein. The present method can be implemented in hardware or software using known or later developed systems, structures, or devices. The teachings hereof may also be implemented as a software routine embedded on a personal computer 314 or as a resource residing on a server or workstation in communication with control unit 306. The methods provided herein can also be implemented by physical incorporation into an image processing, image reproduction, print/copy system, or color management system integrated in whole or in part with any of color marking device 300. Various aspects of the present method may be performed in either the control unit 306 or in the computer system 314. For instance, in one embodiment, the control unit 306 performs the function of measuring the spatial non-uniformity of each of the printheads 320A-D of the color marking device 300, and the computer system 314 performs the function of generating the spatial tone reproduction curves, as claimed, and further combining the generated spatial tone reproduction curves to produce the modified spatial tone reproduction curves used to calibrate the printheads of the color marking device at the color locations of said target primary color. It should be clearly understood that some or all of the functionality of the present system and method can be performed in either of the control unit 306 or the computer system 314 or any combination thereof.

It should also be understood that one or more aspects of the teachings hereof can be implemented on in hardware such as a micro-processor or micro-controller, an ASIC or other integrated circuit, a DSP, an electronic circuit such as a discrete element circuit, a programmable device such as a PLD, PLA, FPGA, PAL, PDA, and the like. In general, any hardware capable of implementing one or more elements of the flow diagrams provided herewith, or portions thereof, can be used. Portions of the present method may also be implemented partially or fully in such hardware devices in conjunction with machine executable instructions or using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

With further reference being made to the color marking device of FIG. 8, associated with each primary color printhead 320A-D is a backing member 322A-D arranged substantially opposite the printheads on the other side of web 302 to position the web so that the gap between the printhead and the print material remains at a constant predetermined distance. As the partially-imaged web moves to receive inks of various colors, it is required that the temperature of the web be maintained to within a given range. A heater (not shown) causes the web surface to reach a predetermined temperature such as, for example, between 40° C. to 65° C., depending on the characteristics of the inks used. In other embodiments, each backing member 322A-D includes heating elements. The combined actions of a preheater plus heating elements maintains the web surface at the desired temperature while receiving ink from the various printheads. Ink is jetted at a temperature higher than the receiving web's temperature. Temperature sensors (not shown) associated with the web. The various backer members can be controlled individually using data from the adjacent printhead, as well as from other printheads.

In the embodiment shown, the ink directed onto web 302 is a "phase-change ink" such that the ink is substantially solid at room temperature and substantially liquid when initially jetted onto the print material substrate. Common phase change inks are typically heated to about 100° C. to 140° C. and are in a liquid phase upon being jetted onto the substrate. Generally, liquid ink cools quickly upon surface contact. A series of midheaters 330 help bring the ink placed on the web 302 to a temperature suitable for desired ink properties when the ink on the web. In one embodiment, a useful temperature for the midheater is about 35° C. to 80° C. The midheater has the effect of equalizing the ink and substrate temperatures to within about 15° C. of each other. Lower ink temperature gives less line spread. Higher ink temperatures may cause the image to be visible from the other side of the print media. The midheater adjusts substrate and ink temperatures to 0° C. to 20° C. above the temperature of the spreader, which will be described below.

Following the midheaters, a spreader 340 applies a predetermined pressure, and in some implementations, heat, to the web. The function of the spreader is to take isolated droplets of ink on the web and smear them out to make a continuous layer by pressure and alternatively heat, so that spaces between adjacent droplets of ink are filled. The spreader 340 may also improve image permanence by increasing ink layer cohesion and/or increasing the ink-web adhesion. In one embodiment, the midheater 330 and spreader 340 are combined in a single unit. The spreader further includes an image-side roll 342 and a pressure roll 344 that apply heat and pressure to the web. Either roll can include heat elements not shown. In one embodiment, the roll temperature in the spreader is maintained at about 55° C. Generally, a lower roll temperature gives less line spread. A roll temperature higher than about 57° C. causes ink to offset to the roll thereby causing imperfections in the gloss. In one embodiment, nip pressure between the rolls is set between 500 and 2000 psi. Lower nip pressure gives less line spread while higher nip pressure reduces roll life. The spreader also includes station 348 suitable for cleaning and/or applying a layer of lubricant or other material to the roll surface. Such a station coats the surface of the spreader with a lubricant such as, for example, an amino silicone oil. Only small amounts of oil are required.

A glosser 350 applies a predetermined combination of temperature and pressure to obtain a desired amount of gloss on the ink that has just been spread by spreader. In one embodiment, the controlled temperature at the glosser is about 30° C. to 70° C. The glosser surface may have a texture that the user desires to impress upon the web surface. The glosser includes an image-side roll 352 and a pressure roll 354 forming a nip through which the web passes. In various applications, elastomeric or rubbery pressure rolls of one or more layers, with effective elastic from about 50 MPa to 200 MPa, are provided. In one implementation, detailed and independent control of the respective temperatures associated with spreader and glosser enables gloss adjustment given particular operating conditions and desired print attributes.

It will be recognized by those experienced in this art that the temperatures and pressures effective for spreading ink of a given formulation will depend on the ink's thermal properties. If solvent-based or water-based inks were used (i.e., not phase-change ink) in the given implementation, the ink would not necessarily land on the media as a drop or droplet but will generally spread out on its own and thus form a smooth layer, rendering, for example, the effect of the spreader and other elements uncertain. Similarly, teachings involving placement of dye or inks on a substantially porous substrate such as woven or knit fabric cloth. Another system wherein multiple images are built up on a single photoreceptor is disclosed in U.S. Pat. No. 6,300,968 assigned to Xerox, which is incorporated herein by reference in its entirety.

Notably, the printing system configuration illustrated in FIG. 9 includes a printhead/print unit configuration different from that of FIG. 8. Specifically, according to one exemplary embodiment, 320A, 320B, 320C and 320D are representative of print units, each print unit including 14 printheads arranged as shown in FIG. 2 and including one primary color.

According to this arrangement, the column-wise test pattern shown in FIG. 4 is produced using the following print units/printheads for each column.

Column 1: C21, C41, M21, M41, Y21, Y41, K21 and K41.
Column 2: C11, C31, M11, M31, Y11, Y31, K11 and K31.
Column 3: C22, C42, M22, M42, Y22, Y42, K22 and K42.
Column 4: C12, C32, M12, M32, Y12, Y32, K12 and K32.
Column 5: C33, C43, M33, M43, Y33, Y43, K33 and K43.
Column 6: C24, C44, M24, M44, Y24, Y44, K24 and K44.
Column 7: C13, C33, M13, M33, Y13, Y33, K13 and K33.

Figure 10:
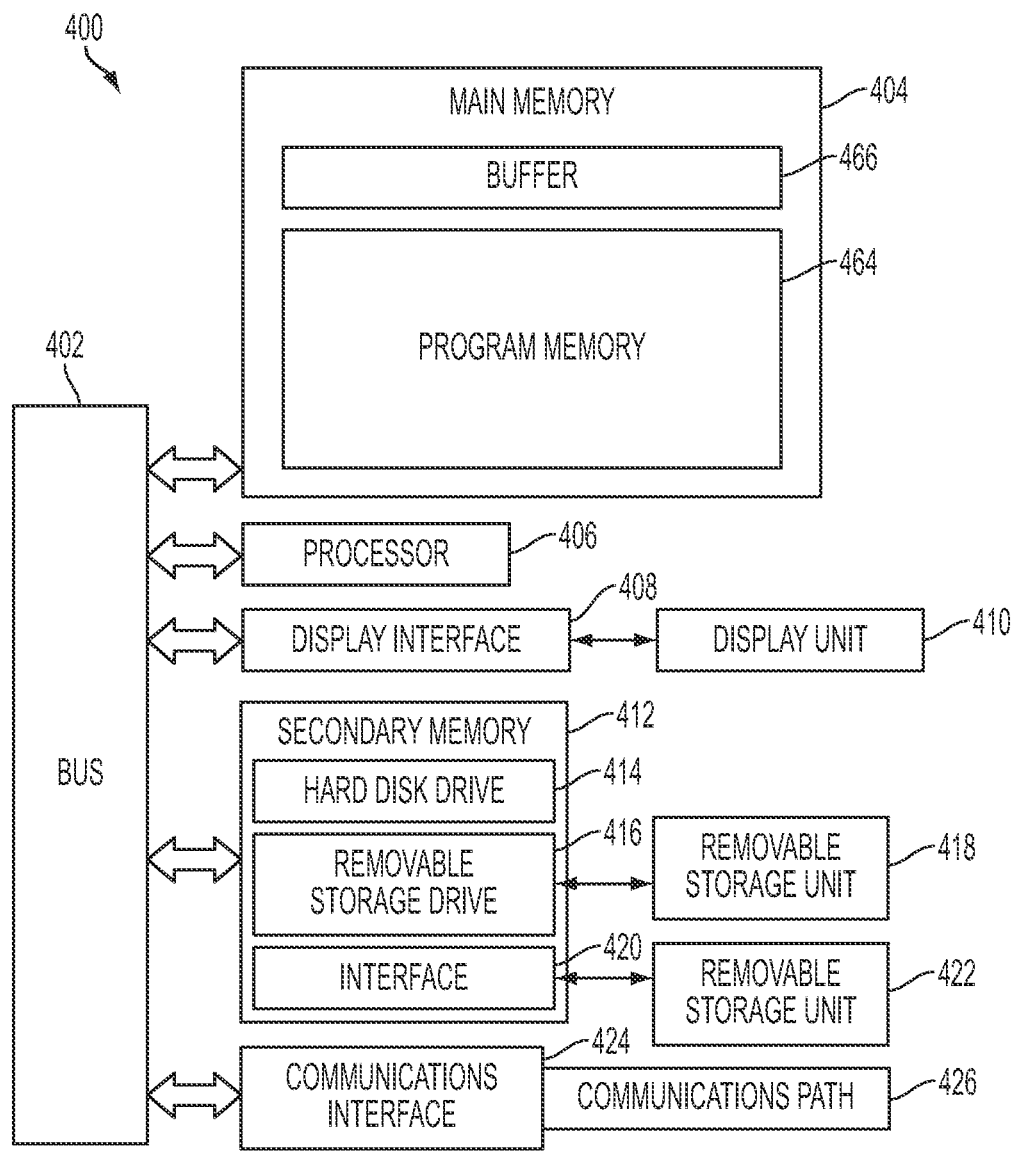
FIG. 10 illustrates a block diagram of an exemplary embodiment of a computer system for implementing one or more embodiments or features of the present disclosure.

Reference is now being made to FIG. 10 which illustrates a block diagram of one embodiment of a computer system useful for implementing the method illustrated in the flow diagram of FIG. 1. The system of FIG. 10 is one which may be implemented in one or both of the computer system 314 or the control unit 306 of FIG. 9.

The computer system 400 includes processor 406 capable of executing machine executable program instructions and is in communication with bus 402. The computer system also includes a main memory 404 to store machine readable instructions containing some or all of the present method hereof to be executed by the processor. The main memory is capable of storing data and may include random access memory (RAM) to support reprogramming and flexible data storage. Main memory may include buffer 466 to store data and a program memory 464 that includes, for example, executable programs that implement the present method as described in the flow diagram of FIG. 1. The program memory is capable of storing data in the buffer 466. The computer system further includes a display interface 408 that forwards data from communication bus 402 to display 410. The computer system also includes a secondary memory 412. The secondary memory may include, for example, a hard disk drive 414 and/or a removable storage drive 416 which reads and writes to removable storage unit 418, such as a floppy disk, magnetic tape, optical disk, etc., that stores computer software and/or data. The secondary memory may also include other mechanisms for allowing computer program instructions to be loaded into the computer system such as, for example, a removable storage unit 422 adapted to exchange data through interface 420. Examples of such other mechanisms include a program cartridge and cartridge interface (such as those implemented in video game devices), a removable memory chip (such as an EPROM, or PROM) and associated socket, and other removable storage units and interfaces 420 which allow software and data to be transferred from the removable storage unit to the computer system. The computer system includes a communications interface 424 which acts as both an input and an output to allow software and data to be transferred between the computer system and external devices. Examples of a communications interface include a modem, a network interface (such as an Ethernet card), a communications port, a PCMCIA slot and card, etc. Computer programs may also be stored in secondary memory. Such computer programs, when executed, enable the computer system to perform the features and capabilities provided herein. Software and data transferred via the communications interface are in the form of signals which may be, for example, electronic, electromagnetic, optical, or other signals capable of being received by communications interface. Computer programs may also be received via the communications interface. These signals are provided to communications interface via a communications path (i.e., channel) 426 which carries signals and may be implemented using wire, cable, fiber optic, phone line, cellular link, RF, or other communications channels.

Figure 11:
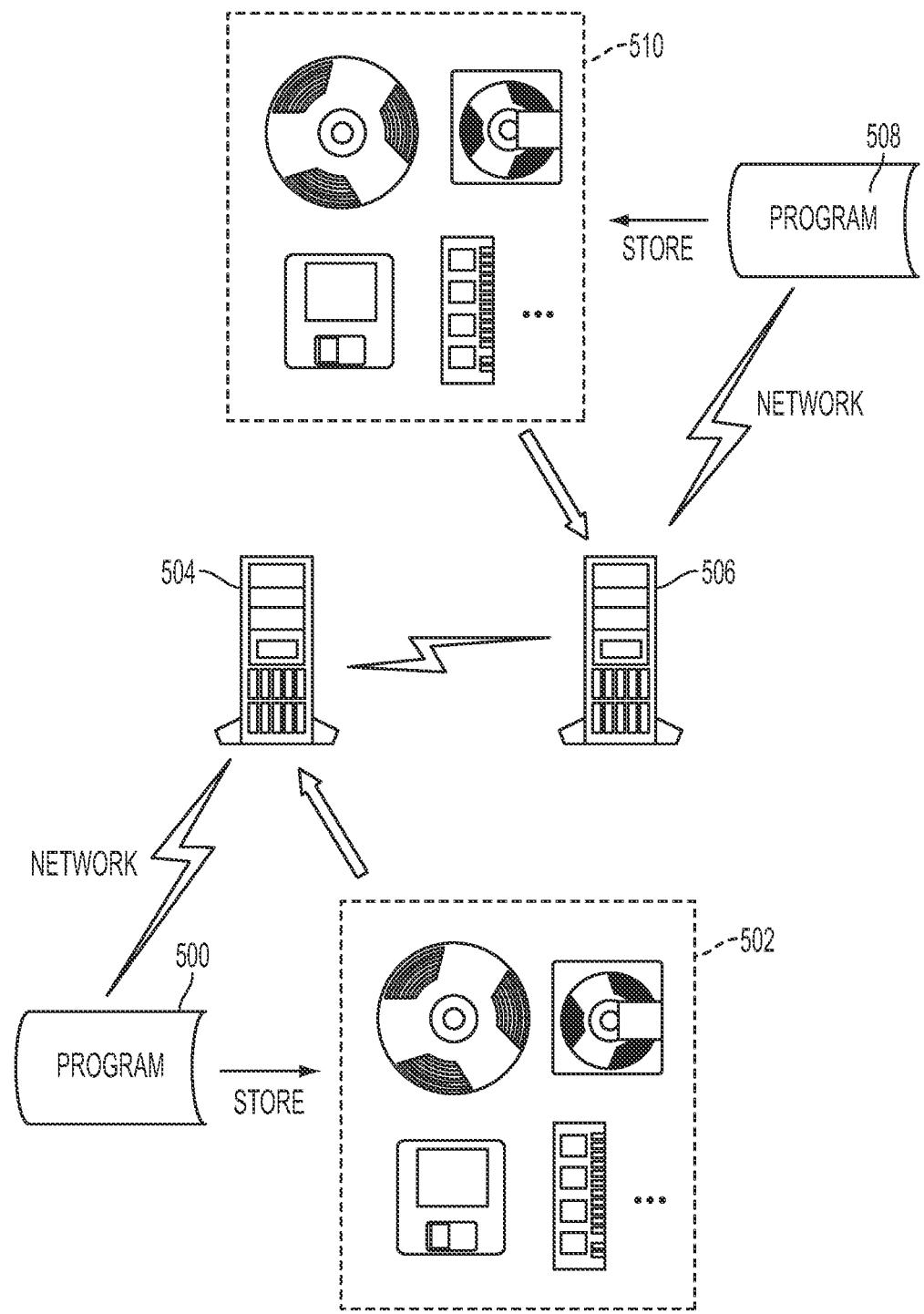
FIG. 11 is a diagram of an exemplary embodiment of a computer storage medium storing machine readable program code containing instructions which, when mounted on a computer system, cause a computer to perform one or more steps of the present method.

Reference is now being made to FIG. 11 which is an explanatory diagram illustrating one example of a computer readable storage medium capable of storing machine readable instructions which, when mounted on a computer system such as system 314 of FIG. 9, cause the computer system to perform one or more steps of the present method. The machine readable instructions may be modified by one computer system and transferred to another computer system. Alternatively, the machine readable instructions may be implemented, in whole or in part, on the control unit 306 of FIG. 9.

One or more computer program instructions 500 for carrying out the present method are loaded on computer-readable storage media 502 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 504 and transferred or otherwise communicated to computer system 506. The program instructions can then be off-loaded to another program 506, in original form or modified, including data, and stored on storage media 510. Both of the computer systems include processors capable of executing program instructions represented by the flow diagram of FIG. 1.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for providing instructions and/or data to the computer system or device for implementing the present method as illustrated in the flow diagram of FIG. 1.

The computer readable medium stores data, instructions, messages packets, or other machine readable information. The computer readable medium may include non-volatile memory, such as a floppy disk, hard drive, memory, ROM, RAM, flash memory, disk memory, and other permanent storage useful, for example, for transporting information such as data and machine readable program instructions. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer readable medium may additionally comprise information in a transitory state medium such as a network link or a network interface which may include a wired network or a wireless network which allows a computer to read such computer readable information.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for creating a printer model which maps device dependent color space representations of reference colors to device independent color space representations of the reference colors for a direct marking color printer including a plurality of colorants, the direct marking color printer including an image receiving surface configured to move in a process direction associated with the direct marking color printer, and the direct marking color printer including a first colorant array of printheads arranged in a cross-process direction to deposit a first colorant marking material onto the image receiving surface and a second colorant array of printheads arranged in a cross-process direction to deposit a second colorant marking material onto the image receiving surface, the first colorant array of printheads and the second colorant array of printheads offset in the process direction, and each printhead including a plurality of ink jets, the method comprising:
   a) generating a color calibration pattern including a plurality of device dependent color space representations of reference colors, the color calibration pattern including a predetermined width associated with the cross-process direction and a predetermined length associated with the process direction, the predetermined width less than or equal to a cross-process width of each printhead;
   b) printing the color calibration pattern using a first printhead associated with the first colorant array and a first printhead associated with the second colorant array, the first printheads substantially aligned along a process direction axis and offset from each other;
   c) printing the color calibration pattern using a second printhead associated with the first colorant array and a second printhead associated with the second colorant array, the second printheads substantially aligned along a process direction axis and offset from each other;
   d) generating device independent color space representations of the color calibration pattern for the first printhead and the second printhead; and
   e) generating a first printer model for the first printheads and a second printer model for the second printheads which maps the plurality of device dependent color space representations of the color calibration pattern to device independent color space representations of the color calibration pattern reference colors.

2. The method for creating a printer model according to claim 1, wherein the color calibration pattern is a plurality of patches associated with different colors.

3. The method for creating a printer model according to claim 1, wherein step e) averages the first printer model and second printer model to generate a final printer model.

4. The method for creating a printer model according to claim 1, the first colorant array of printheads and second colorant array of printheads, each including a first row of three printheads, a second row of four printheads, a third row of three printheads and a fourth row of four printheads.

5. The method for creating a printer model according to claim 1, wherein one or more of the printer models are used to generate a printer ICC profile.

6. The method for creating a printer model according to claim 1, wherein the direct marking color printer is a CMYK printer, the device dependent color space is CMYK color space, and the device independent color space is LAB.

7. The method for creating a printer model according to claim 1, wherein seven printer models are generated and averaged to produce a final printer model.

8. A system for creating a printer model which maps device dependent color space representations of reference colors to device independent color space representations of the reference colors for a direct marking color printer including a plurality of colorants, the system comprising:
- a direct marking color printer including an image receiving surface configured to move in a process direction associated with the direct marking color printer, and the direct marking color printer including a first colorant array of printheads arranged in a cross-process direction to deposit a first colorant marking material onto the image receiving surface and a second colorant array of printheads arranged in a cross-process direction to deposit a second colorant marking material onto the image receiving surface, the first colorant array of printheads and the second colorant array of printheads offset in the process direction, and each printhead including a plurality of ink jets; and
- a controller operatively connected to the direct marking color printer, the controller configured to perform a method comprising:
  a) generating a color calibration pattern including a plurality of device dependent color space representations of reference colors, the color calibration pattern including a predetermined width associated with the cross-process direction and a predetermined length associated with the process direction, the predetermined width less than or equal to a cross-process width of each printhead;
  b) printing the color calibration pattern using a first printhead associated with the first colorant array and a first printhead associated with the second colorant array, the first printheads substantially aligned along a process direction axis and offset from each other;
  c) printing the color calibration pattern using a second printhead associated with the first colorant array and a second printhead associated with the second colorant array, the second printheads substantially aligned along a process direction axis and offset from each other;
  d) generating device independent color space representations of the color calibration pattern for the first printhead and the second printhead; and
  e) generating a first printer model for the first printheads and a second printer model for the second printheads which maps the plurality of device dependent color space representations of the color calibration pattern to device independent color space representations of the color calibration pattern reference colors.

9. The system for creating a printer model according to claim 8, wherein the color calibration pattern is a plurality of patches associated with different colors.

10. The system for creating a printer model according to claim 8, wherein step e) averages the first printer model and second printer model to generate a final printer model.

11. The system for creating a printer model according to claim 8, the first colorant array of printheads and second colorant array of printheads each including a first row of three printheads, a second row of four printheads, a third row of three printheads and a fourth row of four printheads.

12. The system for creating a printer model according to claim 8, wherein one or more of the printer models are used to generate a printer ICC profile.

13. The system for creating a printer model according to claim 8, wherein the direct marking color printer is a CMYK printer, the device dependent color space is CMYK color space, and the device independent color space is LAB.

14. The system for creating a printer model according to claim 8, wherein seven printer models are generated and averaged to produce a final printer model.

15. A color printing system comprising:
- a direct marking color printer including an image receiving surface configured to move in a process direction associated with the direct marking color printer, and the direct marking color printer including a first colorant array of printheads arranged in a cross-process direction to deposit a first colorant marking material onto the image receiving surface and a second colorant array of printheads arranged in a cross-process direction to deposit a second colorant marking material onto the image receiving surface, the first colorant array of printheads and the second colorant array of printheads offset in the process direction, and each printhead including a plurality of ink jets; and
- a controller operatively connected to the direct marking color printer, the controller configured to access a printer profile look-up table to print an image using the direct marking color printer, the printer profile look-up table generated based on a printer model created by a method comprising:
  a) generating a color calibration pattern including a plurality of device dependent color space representations of reference colors, the color calibration pattern including a predetermined width associated with the cross-process direction and a predetermined length associated with the process direction, the predetermined width less than or equal to a cross-process width of each printhead;
  b) printing the color calibration pattern using a first printhead associated with the first colorant array and a first printhead associated with the second colorant array, the first printheads substantially aligned along a process direction axis and offset from each other;
  c) printing the color calibration pattern using a second printhead associated with the first colorant array and a second printhead associated with the second colorant array, the second printheads substantially aligned along a process direction axis and offset in the process direction;
  d) generating device independent color space representations of the color calibration pattern for the first printheads and the second printheads; and
  e) generating a first printer model for the first printheads and a second printer model for the second printheads which maps the plurality of device dependent color space representations of the color calibration pattern to device independent color space representations of the color calibration pattern reference colors.

16. The color printing system according to claim 15, wherein the color calibration pattern is a plurality of patches associated with different colors.

17. The color printing system according to claim 15, wherein step e) averages the first printer model and second printer model to generate a final printer model.

18. The color printing system according to claim 15, the first colorant array of printheads and second colorant array of printheads, each including a first row of three printheads, a second row of four printheads, a third row of three printheads and a fourth row of four printheads.

19. The color printing system according to claim 15, wherein one or more of the printer models are used to generate a printer ICC profile.

20. The color printing system according to claim 15, wherein the direct marking color printer is a CMYK printer, the device dependent color space is CMYK color space, and the device independent color space is LAB.

21. The color printing system according to claim 15, wherein seven printer models are generated and averaged to produce a final printer model.

\* \* \* \* \*